United States Patent [19]
Griffith

[11] Patent Number: 5,455,402
[45] Date of Patent: Oct. 3, 1995

[54] INDUCTION HEATER HAVING A CONDUCTOR WITH A RADIAL HEATING ELEMENT

[75] Inventor: John T. Griffith, Clwyd, United Kingdom

[73] Assignee: EA Technology Ltd., Capenhurst, United Kingdom

[21] Appl. No.: 244,927

[22] PCT Filed: Dec. 17, 1992

[86] PCT No.: PCT/GB92/02343

§ 371 Date: Jun. 14, 1994

§ 102(e) Date: Jun. 14, 1994

[87] PCT Pub. No.: WO93/12627

PCT Pub. Date: Jun. 24, 1993

[30] Foreign Application Priority Data

Dec. 17, 1991 [GB] United Kingdom ............... 9126719

[51] Int. Cl.$^6$ .................................................. H05B 6/10
[52] U.S. Cl. ......................... 219/630; 219/634; 219/670
[58] Field of Search ................................. 219/629, 630, 219/631, 634, 618, 670, 672

[56] References Cited

U.S. PATENT DOCUMENTS

| | | | |
|---|---|---|---|
| 4,366,356 | 12/1982 | Ando | 219/630 |
| 4,678,881 | 7/1987 | Griffith | 219/630 |
| 5,274,207 | 12/1993 | Griffith | 219/630 |

FOREIGN PATENT DOCUMENTS

| | | |
|---|---|---|
| 0036322A1 | 9/1981 | European Pat. Off. . |
| 2600759 | 6/1986 | France . |
| 434567 | 9/1926 | Germany . |
| 814194 | 9/1951 | Germany . |
| 2202407 | 8/1972 | Germany . |
| 2731487A1 | 1/1979 | Germany . |
| 1218216 | 1/1971 | United Kingdom . |
| 1302622 | 1/1973 | United Kingdom . |
| 2135559 | 8/1984 | United Kingdom . |
| 2163930 | 3/1986 | United Kingdom . |
| 2205220 | 11/1988 | United Kingdom . |

*Primary Examiner*—Philip H. Leung
*Attorney, Agent, or Firm*—Westman, Champlin & Kelly

[57] ABSTRACT

An induction heater is provided which has an electrical conductor (40) extending along an axis B. At least one solid heating element (43) for contacting and transferring heat to a material to be heated extends radially from the axis B and is formed of electrically conductive and preferably ferromagnetic material. An alternating electric current is supplied to the electrical conductor (40) to induce an electric current in a closed loop defined by a surface layer of the or each heating element (43) to generate heat therein. Induced eddy currents are confined to a surface layer due to the skin effect. The radial and axial thickness of the heating elements (43) is greater than twice the skin depth of the electrically conductive material at the frequency of the alternating electric current. Preferably the heating element (43) is in the form of a screw arranged on an electrically conductive heating member (42).

16 Claims, 4 Drawing Sheets

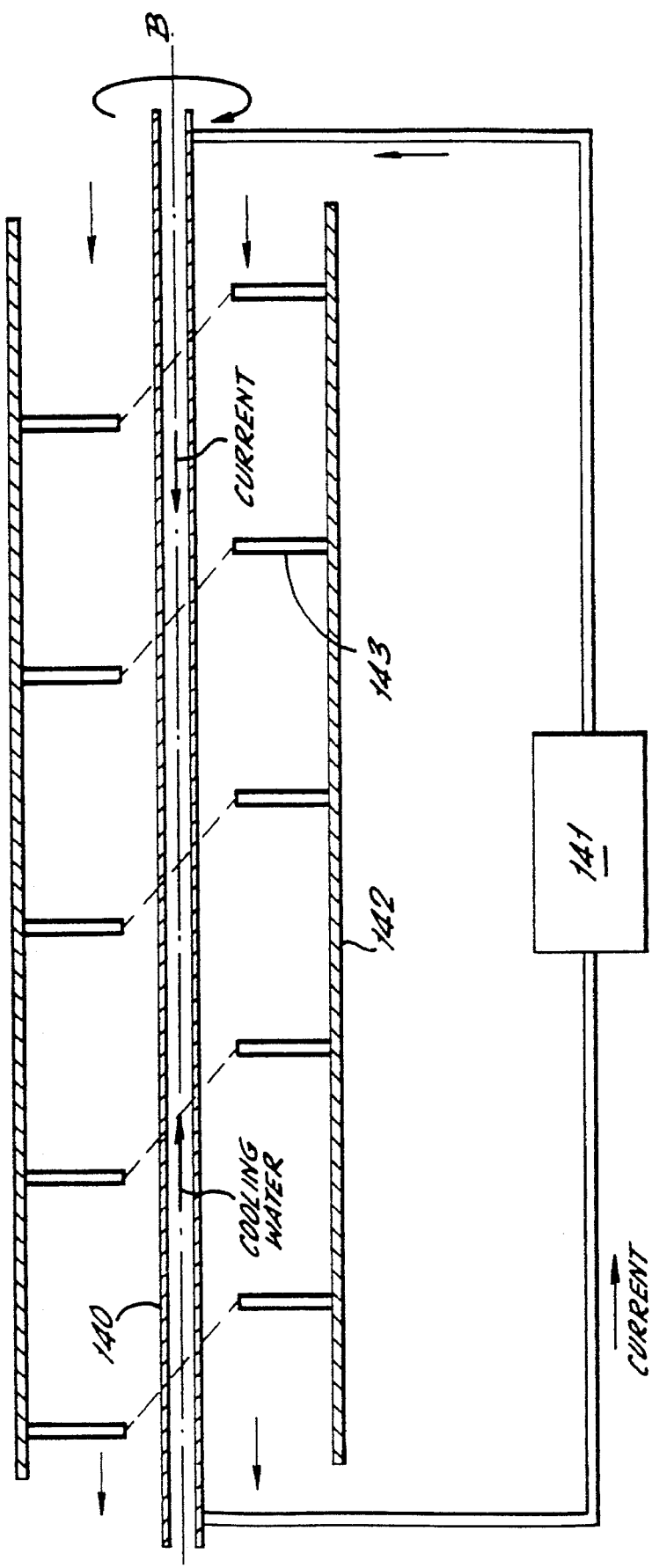

INDUCTION HEATER HAVING A CONDUCTOR WITH A RADIAL HEATING ELEMENT

This invention relates to an induction heater wherein material is heated by contact with an inductively heated heating element.

Bulk or continuous flow heaters are employed as driers or calciners. Typically, a heating member contacts material to be heated so that heat is efficiently transferred from the heating element to the material to be heated. Some degree of mixing action to improve contact can also be incorporated with the heating action of the heating element. This can for example be provided by the heating element with fin members. As a result, contact between the heating element and the material to be heated is enhanced. However, it is preferable to provide substantial uniform heating of the material to be heated. Consequently means are required to supply heat uniformly to the heating member and the fin members thereof.

The supply of heat to the heating element is particularly problematical where fin members are included. Known driers incorporate heating by means of gas jets or hot fluid. Consequently, in order to heat such fin members complicated supply tubing must be engineered into the fin member. It is also known to adapt the fin member to enhance the mixing resulting from movement of the heating element. This only serves to further complicate the design of the fin member. Particular problems are encountered with rotary drum driers and calciners since it is necessary to incoporate rotary couplings for supply of the hot fluid or gases. Consequently, there are a number of drawbacks for heating the heating element of known bulk continuous flow heaters.

GB 2163930 discloses an induction heater having an alternating current carrying conductor extending along an axis. A core means substantially encircles the axis to guide magnetic flux resulting from an alternating current in the conductor. The heating element is an electrically heating closed loop which encircles the magnetic flux in the core means and so is heated by electrical current induced therein.

Two of the embodiments disclosed in GB 2163930 are shown in FIGS. 1 and 2. In the embodiment of FIG. 1, the conductor 1 forms an axis about which is provided a ferromagnetic core 4. The core 4 is enclosed within a metal skin formed from concentrically aligned inner cylinder 5 and outer cylinder 7 and end plates 6 and 9. In this way, the skin forms a closed electrically conducting loop about the core 4. Alternating current set up in the conductor 1 by a toroidally wound transformer 8 set up an alternating magnetic flux which is guided by the core 4. In turn, the alternating flux in core 4 induces currents to flow around the above-mentioned electrically conducting closed loop. The material to be heated is placed within the inner cylinder 5 and is heated by the energy produced in the cylinder by the induced currents. The structure comprising the cylinders 5 and 7 and core 4 can be rotated in the direction of the arrow A. In this way the material to be heated is moved into and out of contact with the cylinder 5 to allow uniform transfer of the heat from the cylinder to the material to be heated.

FIG. 2 shows a continuous flow induction heater. A motor 21 rotates a screw structure 22 in the direction of the arrow A. The screw structure 22 comprises an outer wall 23 which has a spiral slot cut in it to receive screw flight 24. The structure 22 also has an inner wall 25. A toroidal ferromagnetic core 26 is sandwiched between the inner and outer walls 23, 25. An electrically conducting conductor 1, corresponding to that shown in FIG. 1, runs along the axis of the structure 22. As in the embodiment of FIG. 1, a magnetic flux is induced in the core 26 by an alternating current in the conductor 1; this magnetic flux, in turn, induces electrical currents to flow in the walls 23, 25 and the screw flight 24 of the structure 22. The structure 22 is located within a can 28 having an inlet 29 and outlet 30 as shown. Consequently material entering at 29 contacts the structure 22 and is urged towards outlet 30 by the screw flight 24 as the structure 22 is rotated. The material is heated while in contact with the structure 22.

This structure is however quite complicated requiring a toroidal ferromagnetic core 26 to be sandwiched between inner and outer walls 23 and 25. It is an object of the present invention to provide a simplified induction heater.

The present invention provides an induction heater comprising an electrical conductor extending along an axis; at least one solid heating element for contacting and transferring heat to a material to be heated, the or each heating element extending radially from said axis, and being formed of electrically conductive material; and means to apply an alternating electric current to said electrical conductor to induce an electric current in a closed loop defined by a surface layer of the or each heating element to generate heat therein, the radial and axial thickness of the or each heating element being greater than twice the skin depth of the electrically conductive material at the frequency of the applied alternating electric current.

The skin depth of a material is the depth of material from the surface at which the magnetic field and current density fall to l/e of their surface values.

The arrangement of the present invention requires no toroidal ferromagnetic core. The or each heating element can be heated when no electrically conductive loop is provided. This is due to eddy currents which are induced in a surface layer defined by the skin depth of the material of which the heating element is constructed; the skin depth being a function of the magnetic and electric properties of the electrically conductive material from which the heating element is formed as well as the frequency of the applied field produced by the alternating current. The current will flow in a surface layer of the radially extending heating element. Thus the surface of the heating element is heated by this electrical current and a large heating surface area can be presented to the material to be heated.

Preferably the or each heating element is formed of an electrically conductive and ferromagnetic material, since the skin depth will be smaller and greater heating will occur.

In one embodiment of the present invention the or each heating element is adapted to move relative to said axis and to material brought into contact with the or each heating element.

Preferably the radial thickness of the or each heating element is very much greater than said axial thickness. This ensures that the radial heating effect is greater than the heating effect along the axis.

In one embodiment of the invention there is provided a heating member extending substantially parallel to the axis and the or each heating element extends radially and preferably substantially perpendicular from said heating member.

The heating member can conveniently take the form of a cylinder encircling the electrical conductor and adapted to rotate about the axis. The heating member can either be formed to an insulating material, an electrical conductive material, or an electrical conductive and ferromagnetic material. If the heating member is electrically conductive then preferably the radial thickness of the heating member is greater than twice the skin depth of the electrically conductive material at the frequency of the applied alternating electric current.

In one embodiment of the present invention the or each heating element comprises a fin member and the or each fin member is angled such that when the heating member is rotated the material to be heated is urged along the axis of rotation by the or each fin member.

Preferably at least one heating element forms a screw. The screw can be attached to the heating member and when the heating member is rotated, it can urge the material to be heated along the axis of rotation.

In another embodiment of the present invention the or each heating element extend from an outer surface of the heating member to heat a material provided about the outer surface. This arrangement keeps the material to be heated away from the electrical conductor and this helps to keep the electrical conductor cool. Such cooling can be improved by the passage of a coolant. Preferably the electrical conductor comprises a tube and the coolant is passed along the axis through the tube.

In an alternative embodiment of the present invention the or each heating element extends from an inner surface of the heating member.

Examples of the present invention will now be described with reference to the drawings, in which.

Figure 1:
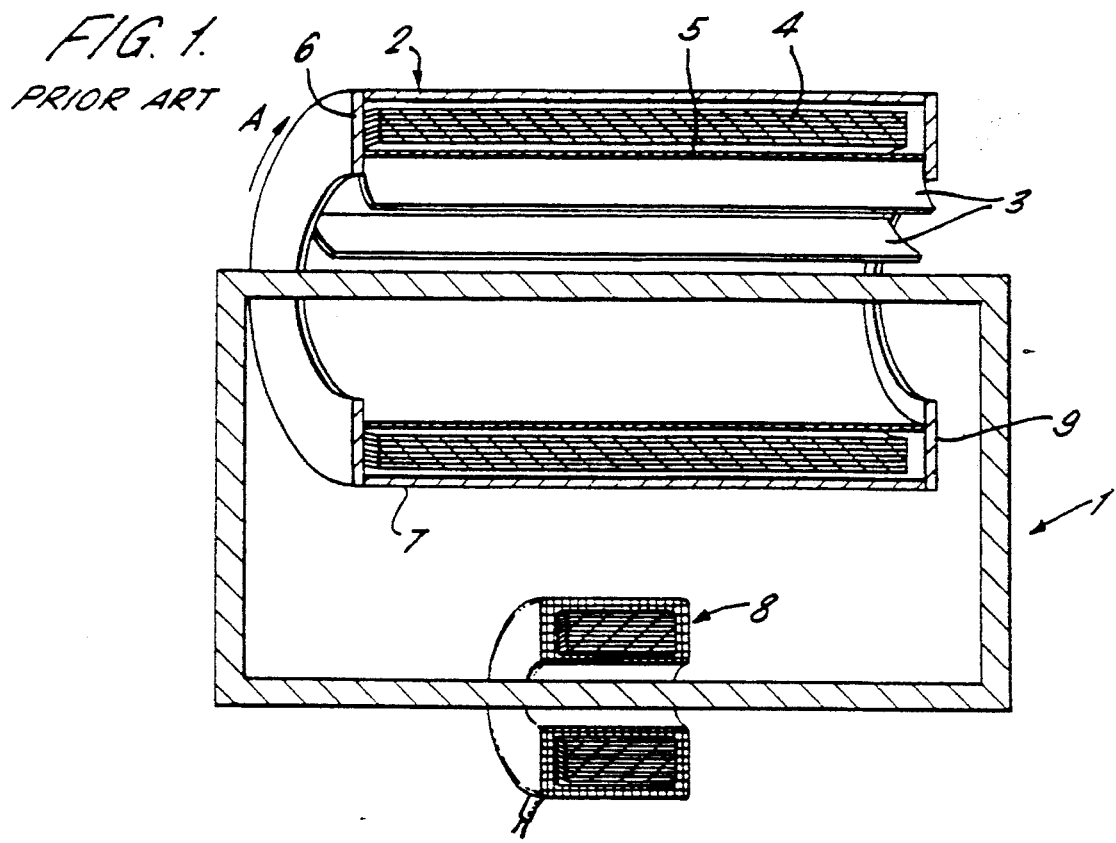
FIGS. 1 and 2 illustrate prior art induction heaters as described hereinabove.
Figure 2:
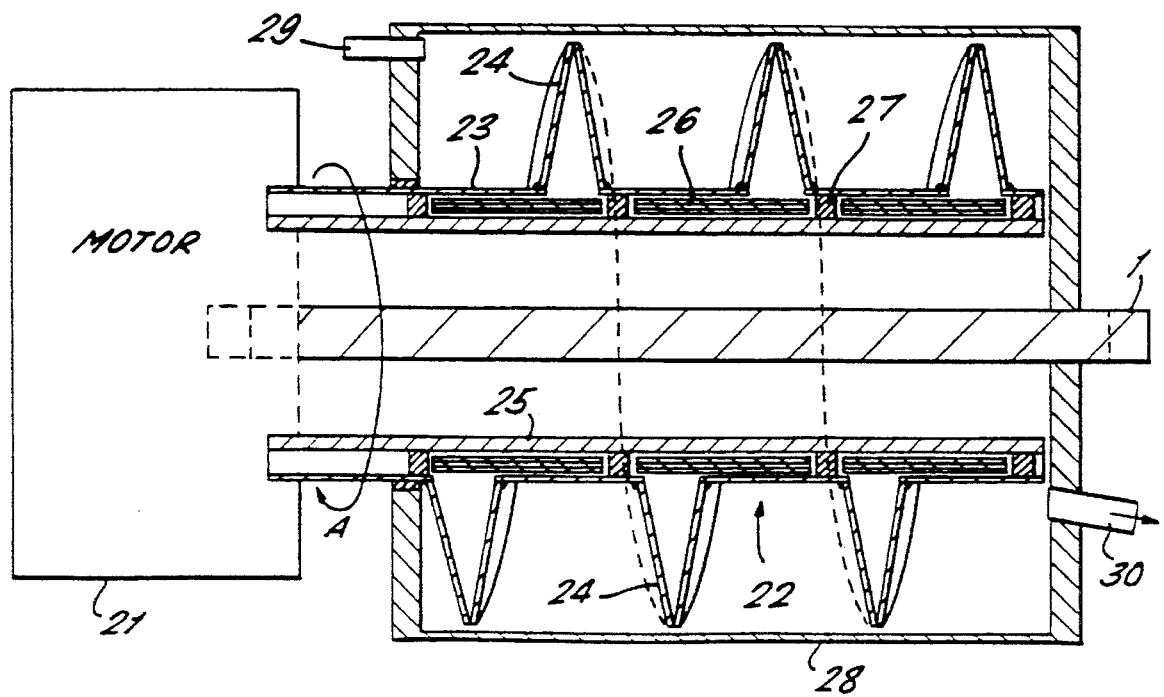
Figure 3:
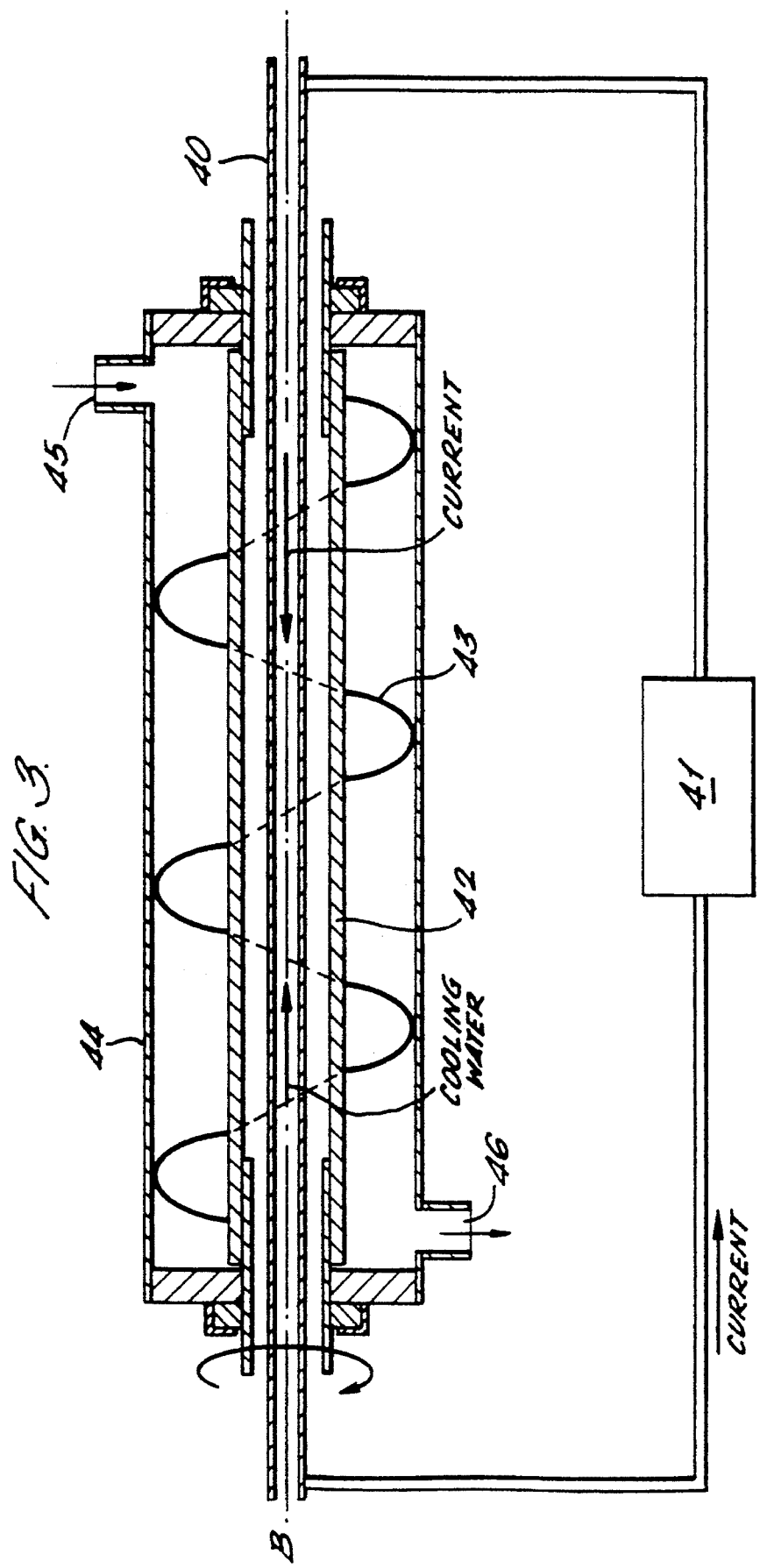
FIG. 3 illustrates a cross-section of one embodiment of the present invention.
Figure 4:
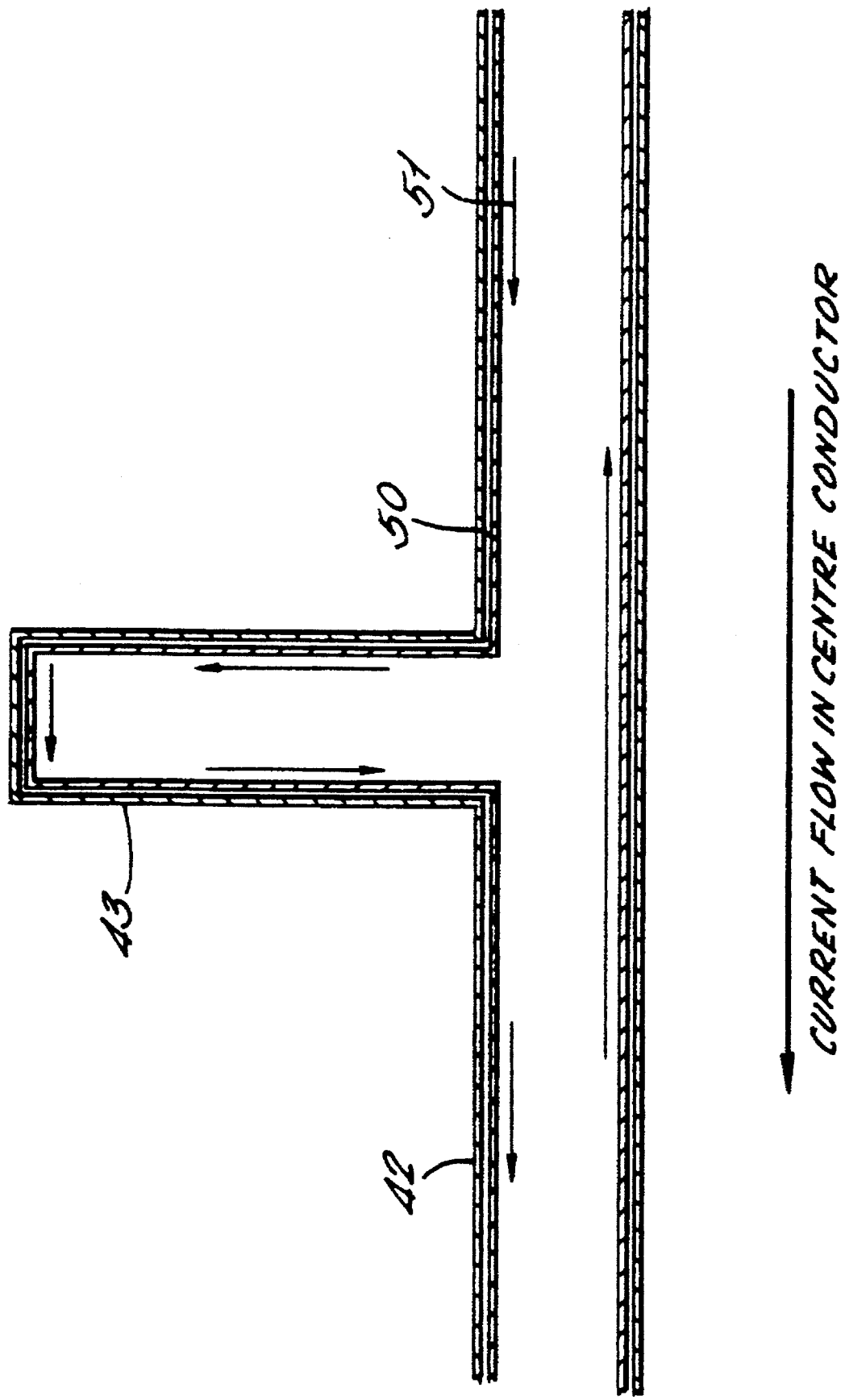

FIG. 4 functionally illustrates a cross-section through the wall of the heating member of FIG. 3; and FIG. 5 illustrates a cross section through an induction heater according to a second embodiment of the present invention.

Referring now to FIG. 3, this is a schematic longitudinal section through a rotatable induction heater according to one embodiment of the present invention. As shown in FIG. 3 the induction heater includes an electrical conductor 40 capable of conducting alternating electric currents and which extend along the axis of rotation B of the induction heater. The electrical conductor 40 which is typically made of copper may be laminated to reduce its AC resistance is connected to a source of alternating current 41. The electrical conductor 40 extends through a solid elongate heating member 42 in the form of a cylinder with an outer surface remote from the electrical conductor 40 having a heating element forming a screw 43. The heating member 42 with screw 43 is rotatable about the electrical conductor 40 and axis B. The heating member 42 and screw 43 are housed within a housing 44 which has an inlet 45 and outlet 46 for the material to be heated. The screw 43 is formed preferably of a ferromagnetic material, to provide greater heating. The heating member 42 may also be formed of ferromagnetic material, although if it is formed of non-ferrous material the screw 43 desirably provides greater heating than the heating member 42.

When an electric current is passed along the electric conductor 40 and the heating member 42 is rotated, the material to be heated is drawn through the inlet 45 and urged by the screw 43 in the direction of the axis of rotation B to the outlet 46. During passage of the material to be heated electrical currents induced in the heating member 42 and screw 43 generate the heat to heat the material. The action of the screw 43 therefore serves to mix the material to be heated during its passage to ensure even heating.

FIG. 4 illustrates the currents induced in the wall of the heating member 42 and in the screw 43. When the alternating current flows down the conductor 40 a circumferential magnetic field is produced which induces eddy currents in a surface layer 50. The induced current on a face proximate to the electrical conductor 40 is opposite in direction. Induced currents are confined to a surface layer due to the skin effect. Thus currents travel parallel to the axis in a closed loop formed by the inner and outer surface layers of the heating member 42. The arrows 51 indicate the direction of the skin currents. At the position of a heating element comprising part of the screw 43, due to the skin effect the induced currents remain in a surface layer and are therefore conducted around the surface of the screw 43 rather than across the base of the screw 43. There is thus an even current over the surface of the heating member 42 with screw 43. Thus the material to be heated in contact with the screw 43 is heated by induced eddy currents. The heating provided over the surface of the heating member 42 with screw 43 provides a large heating surface area.

FIG. 4 only illustrates the instantaneous eddy currents which will alternate with the polarity of the alternating current in the electrical conductor 40.

For the currents in FIG. 4 to flow there must be no short circuit either radially across the heating member 42 or axially across the screw 43. For this condition to be met the thickness of heating member 42 and the screw 43 must be greater than twice the skin depth of the magnetic field at the frequency of the alternating current. The skin depth will vary as a function of the electrical and magnetic properties of the material as well as the frequency of the applied magnetic field produced by the alternating current.

In the arrangement shown in FIG. 3, the screw 43 is arranged on a face remote from the electrical conductor 40. The material to be heated is kept away from the electrical conductor 40. The electrical conductor 40 is thus kept cooler since it is not in contact with the material to be heated. Cooling can be further improved by passage of a coolant such as cooling water through the tubular construction of the electrical conductor 40.

Although the example described hereinabove utilises a screw, heating elements protruding from the heating member 42 could comprise any shaped element that increases the surface area of the heating member 42 and have a radial thickness very much greater than the axial thickness. Ideally these should protrude substantially vertically from the heating member to gain maximum heating effect. For instance, fin members could be used to also propel the material to be heated from the inlet 45 to the outlet 46. Where the material to be heated need not be propelled by the heating member 42, the heating element need not be shaped to urge the material.

To increase the heating of the heating member 42 at a surface remote from the electrical conductor 40, the heating member 42 can be constructed such that the surface remote from the electrical conductor 40 and/or the screw 43 can be constructed from a material of different electrical resistance to the surface proximate to the electrical conductor 40. This arrangement will provide for an differential heating on the outer face in contact with the material to be heated. The skin depth for this material is likely to be different and its thickness must be larger than twice the skin depth in order to ensure that a current can flow in the surface layers.

Although the example described hereinabove utilises an electrically conductive heating member 42, any material can be used for the heating member 42. If an insulating material is used, eddy currents induced in the heating elements 43 flow radially inwardly and outwardly, with a current flowing across the base of the heating element 43 where it joins the heating member 42. In the example described above, for an electrically conductive heating member 42, the eddy currents induced in the heating elements 43 and the heating member 42 can be considered to be equal and opposite at the base of the heating element 43, where it joins the heating member 42.

The induction heater will also operate without a heating member 42, since the eddy currents induced in the heating elements are of primary consideration for the heating effect. However, practically some support for the heating elements must be provided.

In an alternative arrangement to the embodiment described hereinabove, as shown in FIG. 5, the heating element 143 is provided extending from the inner surface of the heating member 142. In such an arrangement the material to be heated is passed through the inside of the heating member 142. No housing 44 need be provided. The heating element 143 in this arrangement is conveniently in the form of a helical screw. In a like configuration to the embodiment shown in FIG. 3 an alternating current source 141 supplies a current to an electrical conductor 140 through which cooling water passes in use. In this embodiment the heating member 142 with internal screw 143 rotates about the axis B thus heating material passing therethrough. The arrows in FIG. 5 refer to the direction of flow of the material to be heated.

I claim:

1. An induction heater for heating a material comprising an electrical conductor extending along an axis; at least one solid heating element for contacting and transferring heat to said material to be heated, said at least one heating element extending radially from said axis, and being formed of electrically conductive material; and means to apply an alternating electric current to said electrical conductor at a frequency to induce an alternating electric current in said at least one heating element to generate heat therein, said means to apply the alternating electric current being arranged to generate the alternating electric current at a frequency wherein the induced alternating electric current flows in a closed circuit comprising a surface layer of said at least one heating element, said surface layer having a thickness of the skin depth of the electrically conductive material at said frequency; the radial and axial thickness of said at least one heating element being greater than twice said skin depth, and said radial thickness of said at least one heating element being substantially greater than said axial thickness.

2. An induction heater as claimed in claim 1, wherein the heating element is formed of electrically conductive and ferromagnetic material.

3. An induction heater as claimed in claim 1, wherein the heating element is adapted to move relative to said axis and to said material to be heated which is brought into contact with the heating element.

4. An induction heater as claimed in claim 1 including a heating member extending substantially parallel to said axis, wherein the heating element extends radially from said heating member.

5. An induction heater as claimed in claim 4, wherein the heating element extends substantially vertically from said heating member.

6. An induction heater as claimed in claim 4, wherein said heating member encircles said electrical conductor to form a cylinder and is adapted to rotate about said axis.

7. An induction heater as claimed in claim 6 wherein each fin member is angled such that when the heating member is rotated the material to be heated is urged along the axis of rotation by each fin member.

8. An induction heater as claimed in claim 6, wherein the heating element extends from an inner surface of said heating member.

9. An induction heater as claimed in claim 4, wherein said heating member is electrically conductive.

10. An induction heater as claimed in claim 9, wherein the radial thickness of the heating member is greater than twice the skin depth of the electrically conductive material at the frequency of the applied alternating electric current.

11. An induction heater as claimed in claim 4, wherein said heating member is electrically conductive and ferromagnetic.

12. An induction heater as claimed in claim 4, wherein the heating element extends from an outer surface of said heating member to heat material at an outer side of said heating member.

13. An induction heater as claimed in claim 12, wherein said electrical conductor is cooled by the passage of a coolant.

14. An induction heater as claimed in claim 13, wherein said electrical conductor comprises a tube and said coolant is passed along said axis through said tube.

15. An induction heater as claimed in claim 1 wherein the heating element comprises a fin member having a radial face which is substantially larger than the axial thickness of said fin member.

16. An induction heater as claimed in claim 1 wherein said at least one said heating element forms a screw.

* * * * *